United States Patent [19]
Whatcott

[11] Patent Number: 5,362,320
[45] Date of Patent: Nov. 8, 1994

[54] SANDABLE LOW SHRINKAGE MORTAR PATCHING/COATING COMPOUND

[76] Inventor: Burton K. Whatcott, P.O. Box 863, Dolores, Colo. 81323

[21] Appl. No.: 120,050

[22] Filed: Sep. 13, 1993

[51] Int. Cl.$^5$ .............................................. C04B 14/00
[52] U.S. Cl. ...................................... 106/709; 106/695; 106/705; 106/708; 106/724; 106/802; 106/823; 106/DIG. 1; 264/DIG. 49
[58] Field of Search ............... 106/692, 695, 705, 709, 106/724, 802, 823, 708, DIG. 1; 264/DIG. 49

[56] References Cited

U.S. PATENT DOCUMENTS

| | | | |
|---|---|---|---|
| 1,138,069 | 5/1915 | Applegate | 52/445 |
| 4,054,691 | 10/1977 | McMillan | 427/322 |
| 4,067,164 | 1/1978 | McMillan | 52/309 |
| 4,210,457 | 7/1980 | Dodson et al. | 106/709 |
| 4,240,952 | 12/1980 | Hulbert, Jr. et al. | 260/42.13 |
| 4,741,777 | 5/1988 | Williams et al. | 106/90 |
| 4,746,365 | 5/1988 | Babcock et al. | 106/695 |
| 4,767,461 | 8/1988 | Tamura et al. | 106/98 |
| 5,108,679 | 4/1992 | Rirsch et al. | 264/118 |
| 5,294,255 | 3/1994 | Smetana et al. | 106/708 |

FOREIGN PATENT DOCUMENTS

| | | | |
|---|---|---|---|
| 2916335 | 8/1979 | Germany | 106/709 |
| 336307 | 4/1972 | U.S.S.R. | 106/737 |
| 621652 | 8/1978 | U.S.S.R. | 106/737 |
| 1057461 | 11/1983 | U.S.S.R. | 106/709 |

Primary Examiner—Mark L. Bell
Assistant Examiner—Michael Marcheschi

[57] ABSTRACT

A polymer modified cement, low shrinkage mortar patching and/or coating compound that can be sanded after drying and has the consistency of drywall compound for coating, patching or taping drywall, plaster, stucco, concrete or wood surfaces.

8 Claims, No Drawings

SANDABLE LOW SHRINKAGE MORTAR PATCHING/COATING COMPOUND

BACKGROUND OF THE INVENTION

This invention relates to a polymer modified Portland cement compound and more particularly to a sandable low shrinkage patching and/or coating compound for interior and exterior walls of buildings.

This compound, called "sand coat" in the industry, can be sanded after it has dried and has the consistency of drywall compound and is available in varying degrees of hardness ranging from easy hand sanding to power grinding hardness. Sand coat is used as a coating, patching or taping compound over drywall, plaster, stucco or concrete. As a taping compound it is not susceptible to moisture deterioration. It can be built up heavily in one coat without shrink cracking. It is easily sanded and accepts paint readily. As a patching compound it will handle thin overlays or heavy fills. It feathers out to nothing and can be sanded or ground down to a perfect patch. As an overlay coating, it covers all blemishes and imperfections and can be textured or troweled smooth.

Sand coat is available as a one component system where only the addition of water is required or as a two component system where a separate powder and liquid admix is furnished.

DESCRIPTION OF THE PRIOR ART

U.S. Pat. No. 1,138,069 discloses a stucco like siding for building purposes comprising a substitute for the usual stucco finishes. The siding comprises a series of composite sheets each composed of a base of waterproof fabric, a pitchy waterproof coating thereon and a granular coating applied to the pitchy coating.

U.S. Pat. No. 4,054,691 discloses a process for promoting the adhesion of cementitious material to closed cell generally smooth skinned foam material.

U.S. Pat. No. 4,067,164 discloses composite panels for building purposes.

U.S. Pat. No. 4,741,777 discloses a dry composition including Portland cement, sand, fly ash Type F, with or without glass fiber, vinyl acetateethylene copolymer or equivalent powder form bonding agent, sodium salts of polymerized substituted benzoid alkyl sulfonic acids, or equivalent dispersing or emulsifying agent, and defoamer or antifoam agent or equivalent defoamer or antifoam agent, which is completely dry and controlled inplant.

U.S. Pat. No. 5,108,679 discloses an asbestos-free cementitious composition comprising lightweight aggregate, hydraulic cement, water and reinforcing fibers in an amount of not more than 4% by weight of the total weight of the composition.

U.S. Pat. No. 4,240,952 teaches a composition comprising Portland cement, fly ash, sand aggregate, gypsum, latex and water.

U.S. Pat. No. 4,767,461 teaches a method for manufacturing concrete wherein cement, water, coarse aggregate and sand are mixed together to form a concrete.

The German patent specification No. 2916335 teaches in the abstract a concrete mixture wherein a hydraulic cement powder is mixed with water to form a slurry. The slurry may include fine aggregate such as gravel and/or sand. The slurry may also contain fly ash, slag, pozzolan, water, glass, etc.

Soviet Union Pat. Specification No. 336307 teaches, in the abstract, a concrete mix containing Portland cement, limestone rubble, porous sand filler and water.

Soviet Union Pat. Specification No. 621652 teaches, in the abstract, a concrete mixture comprising Portland cement, sand, gravel and water.

Soviet Union Pat. Specification No. 1057461 teaches, in the abstract, a mortar composition which comprises Portland cement, sand, ash or fly ash, and crushed fuel slag or stone siftings or burnt rock.

None of the known prior art disclose the improved lightweight, self curing, shrinkage controlled cementitious coatings set forth herein for interior and exterior wall surfaces.

SUMMARY OF THE INVENTION

In accordance with the invention claimed, a greatly improved polymer modified sandable mortar is disclosed which may be applied as a coating, patching or taping compound over drywall, plaster, stucco or concrete. The bond strength is so great that it becomes monolithic to the surface it is applied to. No water curing is required for this mortar finish to achieve required tensile, flexural and compressive strengths. This sandable mortar finish has a tough elasticity that resists shrinkage and cracking in all but extreme situations. It is highly water resistant and can be sanded or ground down to a perfect patch overlay coating. This formulation has a very low water/cement ratio with excellent workability.

The mortars disclosed and claimed herein are unique due to the use of fine fly ash fillers used in conjunction with Portland cement in order to make the hardened mortar sandable. Unlike other mortar compositions which may use fly ash as a replacement for up to 30% of the Portland cement in the composition, this mortar composition uses fly ash as the filler (aggregate) while at the same timer the fly ash adds cementitious qualities to the formulation thereby reducing the water/cement ratio and mortar shrinkage even though the fillers are very fine. Polymer solids are used in varying proportions to adjust the toughness of the hardened mortar. The polymers also add high bond strength, resilience, and moisture resistance to the hardened mortar. By varying the amount of polymer solid in the formula, the toughness of the hardened mortar may be adjusted from being easily sandable to requiring a power grinder to smooth and level the hardened surface.

The cellulose in the formulation acts as a plasticizer, water reducer and retarder thus giving excellent workability, toughness and long open time to the mortar while reducing the water to cement ratio and mortar shrinkage.

The total combination produces a unique mortar comprising very fine sandable fillers that does not shrink or crack when applied paper thin or in heavy fills.

It is, therefore, one object of this invention to provide a new and improved cementitious coating, patching or taping compound for use on interior and exterior walls of buildings.

Another object of this invention is to provide an improved polymer modified Portland cement low shrinkage patching or coating material with improved flexibility and bonding characteristics which will adhere more reliably to the surface of most substrates and may be troweled, sanded or ground smooth.

A further object of this invention is to provide improved polymer modified moisture resistant cementitious patching or coating material that employ polymers to insure flexibility and toughness and thereby eliminate or greatly reduce cracking of the cementitious material with time.

Further objects and advantages of the invention will become apparent as the following description proceeds and the features of novelty which characterize this invention will be pointed out with particularly in the claims annexed to and forming a part of this specification.

DESCRIPTION OF THE PREFERRED EMBODIMENT

The disclosed invention relates to polymer modified Portland Cement, low shrinkage mortar patching or coating patching compound for use as a taping compound or as a cover for interior and exterior walls and ceilings of buildings and structures with or without a base mortar coating. The improved polymer modified finish called send coat or coatings in the trade can be sanded and exhibit greatly enhanced bond, toughness, as well as much greater resistance to cracking and moisture than conventional mortar finishes.

The improved polymer modified mortars disclosed herein bond tenaciously to most substrates and require no water curing to reach variable strengths that are controlled by the percentage of polymer solids utilized in the formulation. Unlike conventional finish mortars, the improved claimed polymer modified finish exceeds the workability, shrinkage and crack resistance of the prior art. Because of the fine fillers of the improved finishes they are easier to apply and may be trowelled or sanded to a feathered edge.

The invention is best illustrated by the following examples. The titles of these examples are merely given by way of illustration and are not intended to restrict the scope of the invention or the manner in which it can be practiced. Throughout the examples and the specification, unless specifically provided otherwise, parts and percentages of the various mortars are given as approximately parts and percentages by weight.

| SAND COAT REGULAR SET | |
|---|---|
| 94.00 lbs. Portland Cement | Type K |
| 242.50 lbs. Pozzolanic Filler | Fly Ash |
| .90 lbs. Thickener | Hydroxyethyl Cellulose |
| Polymer Solids ranging from 2% to 25% of weight of cement (determining factor for hardness) | Styrene Butadiene Rubber |
| Water | As needed for desired consistency |
| SAND COAT FAST SET | |
| 23.50 lbs. Aluminite Cement | |
| 70.50 lbs. Portland Cement | Type K |
| 242.50 lbs. Pozzolanic Filler | Fly Ash |
| .90 lbs. Thickener | Hydroxyethyl cellulose |
| Polymer Solids ranging from 2% to 25% of weight of cement (determining factor for hardness) | Styrene Butadiene Rubber |
| Water | As needed for desired consistency |

Type and useful range of components in the disclosed formulations:

Portland Cement—any type ranging from 20% to 70% by weight in the slow set formulation. Ranging from 1% to 99% in the fast set formulation where aluminite cement may be used as a full or partial replacement.

Aluminite Cement—may be used in the East setting formulation to replace from 1% to 100% of the Portland cement.

Pozzolanic Filler—fly ash type C or type F or natural pozzolan fillers in screen size ranges, from #-325 to #200. May be used in a range from 30% to 80% by weight of the total formulation.

Thickener—hydroxyethyl cellulose, hydroxypropyl cellulose or methyl cellulose used in a range from 0.10% to 2% by weight of Portland or aluminite cement in formulation.

Polymer Solids—may be acrylic, styrene acrylic, styrene butadiene rubber or poly vinyl acetate used in a range from 1% to 25% by weight of Portland or aluminite cement in formulation.

Polymer Solids—may be acrylic, styrene acrylic, styrene butadiene rubber or poly vinyl acetate used in a range from 1% to 25% by weight of Portland or aluminite cement. Polymer may be dry solids or in solution.

REMARKS

The following ingredients may be added to modify the above formulas for specific properties.

Accelerators—ranging up to 6% of the Portland or aluminite cement may be used to reduce the set time of the regular set or fast set sand coat.

Defoamer—ranging from 1% to 20% by weight of the polymer solids may be used to adjust the air entrainment created by the polymers.

Water Reducers—(plasticizers, superplasticizers) may be used to decrease the water/cement ratio for heavy fill patching or to increase strength characteristics.

Preservatives—ranging up to 1% of the total mix may be used in the liquid admix of two component systems to increase shelf life.

Waterproofing Additives—ranging up to 1% to 10% of the total mix may be used to increase water resistance of the formulation.

Silica Fume—may be used to replace up to 60% of the Portland or aluminite cement in the formulation.

Colorants—organic or inorganic may be added up to 10% of the formulation.

Fine Filler Aggregate—(organic or inorganic) ranging in sieve size from #-325 to #12 may be used to replace a portion of the pozzolanic fillers in the formulation.

Dispersants—ionic or anionic dispersants may be used as needed in the formulation.

Plasticizers—lime, air entraining agents etc. may be used to increase workability.

Although but a few embodiments have been illustrated and described, it will be apparent to those skilled in the art that various changes and modifications may be made therein without departing from the spirit of the invention or from the scope of the appended claims.

What is claimed is:

1. A cementitious patching and/or coating compound for drywall, plaster, concrete or stucco consisting of:
   approximately 94 pounds of cement,
   approximately 0.90 pounds of a thickener,
   approximately 242.5 pounds of a pozzolanic filler,
   approximately 2% to 25% by weight of said cement of polymer solids and an effective amount of water as needed for spreading consistency.

2. The cementitious compound set forth in claim 1 wherein:
   said thickener comprises hydroxyethyl cellulose,
   said pozzolanic filler comprises fly ash, and
   said polymer solids comprise styrene butadiene rubber.

3. The cementitious compound set forth in claim 1 wherein:
   said cement comprises ¼ by weight of aluminite cement.

4. The cementitious compound set forth in claim 1 wherein:
   said cement comprises Portland Cement.

5. The cementitious compound set forth in claim 1 wherein:
   said polymer solids comprises approximately 1.88 pounds.

6. The cementitious compound set forth in claim 1 wherein:
   said polymer solids comprise approximately 23.5 pounds.

7. A slow set cementitious patching and/or coating compound for drywall, plaster, concrete or stucco consisting of:
   from about 20% to 70% by weight of Portland cement,
   from about 30% to 80% by weight of pozzolanic filler,
   from about 0.1% to 2% of the weight of the Portland cement of a thickener, and
   from about 1% to 25% of the weight of the Portland cement of polymer solids.

8. A fast set cementitious patching and/or coating compound for drywall, plaster, concrete or stucco consisting of:
   from about 1% to 99% by weight of cement, the cement including aluminite cement from about 1% to 100% of the weight of the cement,
   from about 30% to 80% by weight of pozzolanic filler,
   from about 0.1% to 2% of the weight of the Portland cement of a thickener, and
   from about 1% to 25% of the weight of the Portland cement of polymer solids.

* * * * *